Jan. 6, 1942. E. C. BROWN 2,268,922
AUTOMATIC CONTROL FOR TROLLEY FROGS
Filed Oct. 7, 1937 2 Sheets-Sheet 1

INVENTOR
EVERETT C. BROWN
BY John L. Milton
ATTORNEY

Jan. 6, 1942.      E. C. BROWN      2,268,922
AUTOMATIC CONTROL FOR TROLLEY FROGS
Filed Oct. 7, 1937      2 Sheets-Sheet 2

INVENTOR
EVERETT C. BROWN
BY John L. Milton
ATTORNEY

Patented Jan. 6, 1942

2,268,922

UNITED STATES PATENT OFFICE 2,268,922

AUTOMATIC CONTROL FOR TROLLEY FROGS

Everett C. Brown, Louisville, Ky., assignor to Cheatham Electric Switching Device Co., Incorporated, Louisville, Ky., a corporation of Kentucky Application October 7, 1937, Serial No. 167,687

11 Claims. (Cl. 191—38)

My invention relates to an improved control system for automatically operating electrically-operated trolley frogs at a "turn-out" on a trolley bus system.

In trolley bus systems, where a "turn-out" is required, it is necessary to provide a switching device to direct the path of travel of the trolley bus current collectors along the overhead conductors.

In trolley bus operation, experience has shown that the "drag" of the trolley poles cannot be depended upon to direct the current collectors through trolley frogs at a turn-out point properly, as is the case in electric street railway operation, where the rails and switch tongue provide a definite path of travel for the street cars. Therefore, in trolley bus operation, an especially constructed frog having an electrically-operated tongue is provided in each conductor, which provides a definite path of travel for the current collectors at the "turn-out" point.

To control the operation of the tongues, it is customary to employ the conventional "power-on" and "power-off" method of control. That is, to provide selective operation of the electrically-operated tongues, the operator is required to place the bus motor controller in either the "on" or "off" position, depending on which route the bus is to follow. Usually, in this method of control, the mechanism is arranged so that placing the controller in the "on" position, selects the "turn-out" route; while, placing the controller in the "off" position selects the "through" route.

Another system of controlling the operation of the tongues, utilizes the relative longitudinal position of the current collectors one to another, as determined by the angularity of the trolley bus with respect to the overhead conductors, to provide selective operation of the electrically-operated tongues according to the simultaneous engagement of contact devices located adjacent the overhead conductors.

Thus, a bus following the "through" route, will provide little or no angular longitudinal displacement of the current collectors with respect to the overhead conductors, and, upon simultaneously engaging a pair of contact devices located substantially opposite each other, a mechanism is operated to position the frog tongues to accommodate the "through" movement. Obviously, when the bus is following the "turn-out" route, a substantial, angular longitudinal displacement of the current collectors with respect to the overhead conductors is provided, and the contact device in one conductor is engaged and disengaged before the contact device in the other conductor is engaged, therefore, providing no operation of the frog tongues.

Thus, to provide operation of the frog tongues for the "turn-out" route, a similar set of contact devices longitudinally offset with respect to each other are provided, and arranged so that they are simultaneously engaged, only when the current collectors assume the said angular longitudinal position.

Various modifications of the foregoing have been tried, but each are defective in that any angularity of the bus intermediate the mentioned positions, for the "through" and "turn-out" movements, reduces materially the length of time the current collectors simultaneously engage the contact devices.

In some instances, suitable markings have been placed on the surface of the street paving to indicate to the bus operator the approximate path the bus must follow to provide proper selection and operation of the trolley frog tongues.

Thus, although the system utilizing the longitudinal displacement of the current collectors to provide selection has been recognized as desirable over the former "power-on" and "power-off" arrangement the embodiments of the principle thus far have inherent disadvantages.

It is therefore the object of my invention to eliminate these inherent disadvantages, and to provide a system that will provide a decided improvement in the performance of the said "displacement" method of selection.

A further object of my invention is to provide a system that will require only the minimum number of contact devices.

Another object of my invention is to provide quick-acting relay apparatus arranged and constructed so that the selection will be substantially instantaneous upon the engagement of the current collectors and contact devices, and which will retain such selection regardless of any changes that may take place in the relative angularity of the bus thereafter.

A further object of my invention is to provide relay apparatus that will establish a predetermined time of current application, for the operation of the frog tongues, regardless of the speed of the vehicle.

A still further object of my invention resides in organizing the relay apparatus so that one contact device always functions to provide selection, while the other contact device always functions to provide operation according to the selection determined by the said one contact device.

These and other objects of my invention, as may hereinafter appear, are best understood from the following description of the accompanying drawings illustrating various embodiments thereof.

Figure 1:
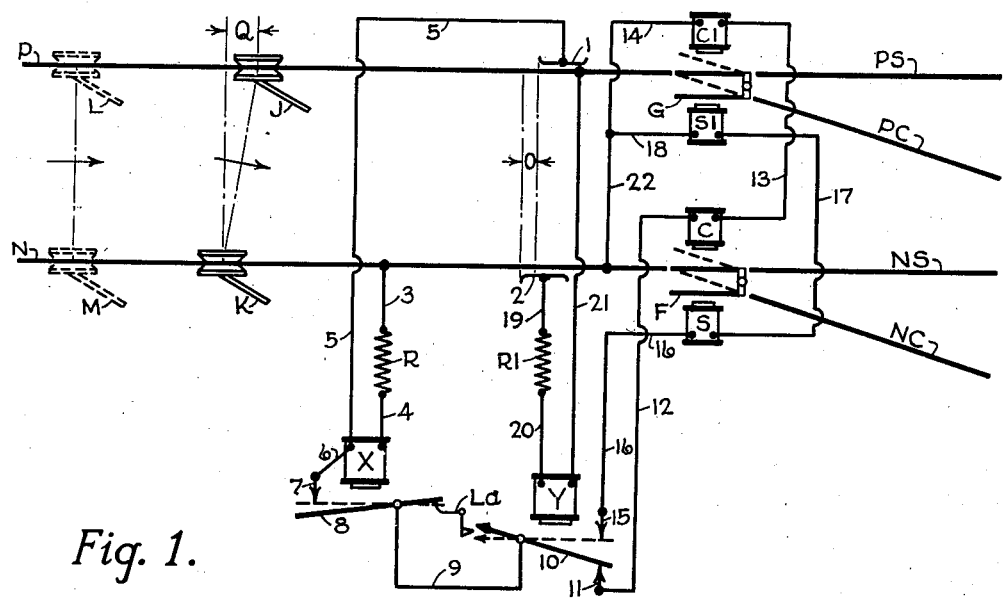
Fig. 1 is one illustration of a control system for an electrically-operated trolley frog embodying the principal features of my invention.

Referring now in particular to Figure 1, it will be observed that the system includes a pair of overhead current conductors P and N. These conductors are engaged by the current collectors of the trolley buses, and supply the "feed" and "return" circuits, respectively, for the propulsion current of the trolley buses. The characters F and G, designate movable frog tongues at a "turn-out" point, which provide a definite path of travel for the collectors of the trolley buses to either the "through" or "turn-out" routes. The characters PS and NS designate the conductors for the "through" route, while characters PC and NC designate the conductors for the "turn-out" route.

Pairs of operating coils C1—S1 and C—S, are provided to operate electrically frog tongues F and G respectively.

Located adjacent the conductors P and N are positioned contact devices 1 and 2. The character O designates a slight displacement in the longitudinal positioning of the contact devices, sufficient to assure operation of relay Y in advance of relay X, for the bus following the "through" movement.

Characters J and K designate the current collectors of a trolley bus preparing to follow the "turn-out" route to the right. Therefore, the left-hand collector J is in advance of the right-hand collector K. The character Q designates the longitudinal displacement between the current collector J and K when the trolley bus is preparing to follow the "turn-out" route.

Characters L and M designate the current collectors of a trolley bus preparing to follow the "through" route. Therefore, the collectors are substantially opposite each other.

To differentiate between the collectors of the vehicle following the "turn-out" route, and those of the vehicle following the "through" route, the former are shown in solid lines, while the latter are shown in dotted lines.

Describing first the operation of the apparatus in Figure 1 for collectors J and K, it will be obvious that, whenever the longitudinal distance Q is greater than the longitudinal distance O, the collector J will engage contact device 1 before collector K engages contact device 2. Thus relay X is operated before relay Y.

The circuit providing energization of the operating coil of relay X being completed from positive conductor P, through collector J, contact device 1, wire 5, coil of relay X, wire 4, resistor R, wire 3 to negative conductor N.

The operation of relay X raises armature 8, actuates mechanical latch La, and thereby locks armature 10 in engagement with back contact 11. Raising armature 8 also brings same into engagement with front contact 7, thereby providing energization of operating coils C and C1. The circuit for the latter being completed from positive conductor P, through collector J, contact device 1, wire 5, wire 6, front contact 7, armature 8, wire 9, armature 10, back contact 11, wire 12, operating coil C, wire 13, operating coil C1, wires 14 and 22 to negative conductor N. Energizing operating coils C and C1, operates frog tongues F and G, respectively, thereby forming a definite path of travel for collectors K and J to the "turn-out" route.

A short time after collector J engages contact device 1, collector K engages contact device 2. The engagement of collector K and contact device 2 provides energization of the operating coil of relay Y. The latter circuit being completed from negative conductor N, through collector K, contact device 2, wire 19, resistor R1, wire 20, coil of relay Y, wire 21 to positive conductor P.

It will be obvious that the energization of the coil of relay Y at this time cannot raise armature 10, as latch La is retaining same in engagement with back contact 11, as aforesaid.

Collector J ordinarily disengages contact device 1 before collector K disengages contact device 2.

When collector J disengages contact device 1, the circuit providing the energization of the coil of relay X via wire 5, and likewise the operating coils C and C1 via contact 7, is opened. Thus, armature 8 returns to normal unattracted position and removes latch La from armature 10. However, since the circuit via contact 7 is open, no further operation of the trolley frog coils takes place at this time.

Subsequently collector K disengages contact device 2, thereby de-energizing the coil of relay Y, which restores armature 10 to normal unattracted position.

Obviously, since the sequence of disengagement of collectors J and K is not material to the operation of my invention, they can be made of any length, consistent with operating requirements, so long as the longitudinal distance O is provided, as aforesaid.

Describing now the operation of Figure 1 for collectors L and M, it will be obvious that, whenever the longitudinal distance Q is less than the longitudinal distance O, or when the collectors L and M are substantially opposite each other, the collector M will engage contact device 2 before collector L engages contact device 1. Thus relay Y is operated before relay X, and armature 10 is raised into engagement with front contact 15. The subsequent operation of relay X, actuates latch La to lock armature 10 in engagement with contact 15, and raises armature 8 into engagement with front contact 7.

Since armature 10 is in engagement with front contact 15, the engagement of armature 8 and front contact 7 provides energization of the operating coils S and S1. The circuit for the latter being completed from the positive conductor P, through collector L, contact device 1, wire 5, wire 6, contact 7, armature 8, wire 9, armature 10, contact 15, wire 16, operating coil S, wire 17, operating coil S1, wires 18 and 22 to negative conductor N. Energizing operating coils S and S1 operates frog tongues F and G, respectively, thereby forming a definite path of travel for the collectors L and M to the "through" route.

Ordinarily collector M disengages contact device 2 before collector L disengages contact device 1. When collector M disengages contact device 2, the coil of relay Y is deenergized. However, armature 10 can not disengage front contact 15, as latch La retains the engagement thereof as long as armature 8 is raised and engaging contact 7.

Therefore, when collector L disengages contact device 1, the circuit providing the energization of the coil of relay X via wire 5, and likewise the operating coils S and S1 via contact 7, is opened. Thus, armature 8 returns to normal unattracted position and removes latch La from armature 10, which, in turn, permits armature 10 to return to normal unattracted position.

Each of the trolley frog tongues F and G are provided with a toggle spring, or its equivalent, to retain same in either of their positions. Since this feature does not form a part of this invention, and since the construction and arrangement of such is well known in the art, it has not been illustrated in the accompanying drawings.

From the foregoing, it will be further obvious that, since relay Y must operate before relay X to provide the proper operation of the frog tongues F and G for the "through" movement, the relay Y can be constructed and arranged to be faster acting than relay X, thereby obviating the requirement of the longitudinal distance O between contact devices 1 and 2. Under this arrangement the contact devices 1 and 2 are located substantially opposite each other. It is to be understood, however, that in providing for such an arrangement, the speed of relay X must be arranged to operate during the time determined by the longitudinal distance Q.

Thus, although I have illustrated a longitudinal distance O between contact devices 1 and 2 as a preferred manner of providing an operation of relay Y before relay X, I do not desire to be limited to this arrangement other than by the scope of the appended claims.

Figure 2:
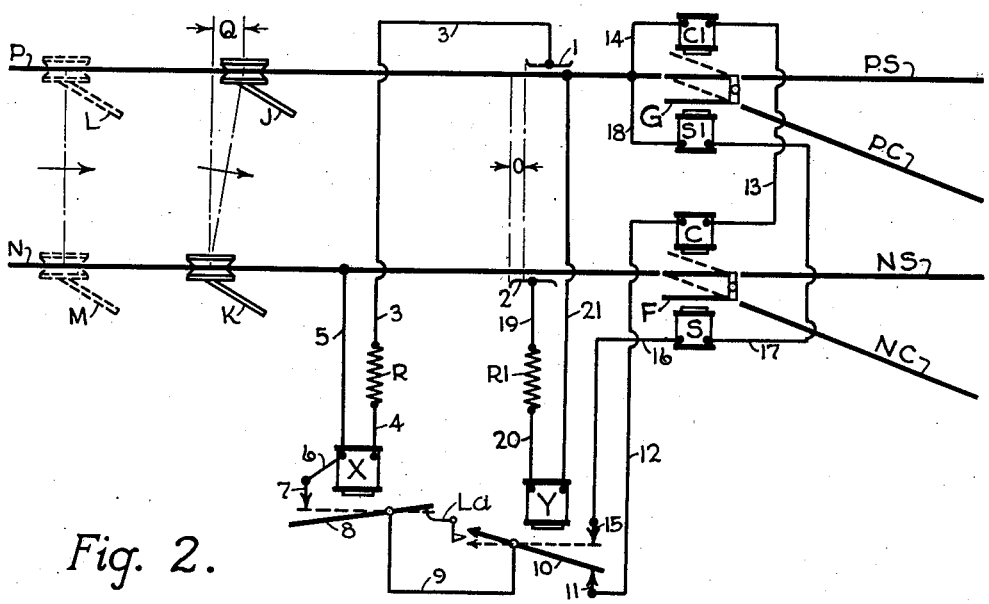
Fig. 2 illustrates one modification of Figure 1, in which the connections to relay X and the trolley-frog operating coils are altered, so that the operating circuit of said coils is entirely independent of the contact devices.

The operation of the apparatus in Figure 2 is substantially the same as that of Figure 1. However, in Figure 2, the circuits of the trolley frog operating coils have been altered so as to be entirely independent of the contact device 1. Thus, it is considered sufficient merely to designate these alterations, and the features provided thereby. Comparing Figure 2 with Figure 1, it will be observed that wires 3 and 5 of Figure 2 have been connected reversely to that illustrated and described for Figure 1.

Thus, wire 3 being connected to contact device 1, and wire 5 to negative conductor 5, provides a direct electrical connection of armature 8 to the negative conductor N whenever the armature 8 is raised into engagement with front contact 7. Therefore, to provide the proper completion of the circuits for the trolley-frog operating coils C—S and C1—S1, wire 22 of Figure 1 has been omitted in Figure 2, and wires 18 and 14 connected to the positive conductor P.

For the purpose of illustrating the operation of the altered circuit connections of the trolley-frog operating coils in Figure 2, it will be assumed that the collectors J and K approach the "turnout."

When collector J engages contact device 1, relay X will operate, the circuit therefore being completed from positive conductor P, through collector J, contact device 1, wire 3, resistor R, wire 4, coil of relay X, wire 5 to negative conductor N.

The operation of relay X raises armature 8, actuates mechanical latch La and thereby locks armature 10 in engagement with back contact 11. Raising armature 8 also brings same into engagement with front contact 7, thereby providing energization of operating coils C and C1. The circuit for the latter being completed from negative conductor N through wire 5, wire 6, front contact 7, armature 8, wire 9, armature 10, back contact 11, wire 12, operating coil C, wire 13, operating coil C1, wire 18, to positive conductor P. Thus, the energization of the operating coils C and C1 has been provided for, without requiring the current therefore to flow through the contact device 1 and current collector J, as described for Figure 1.

Figure 3:
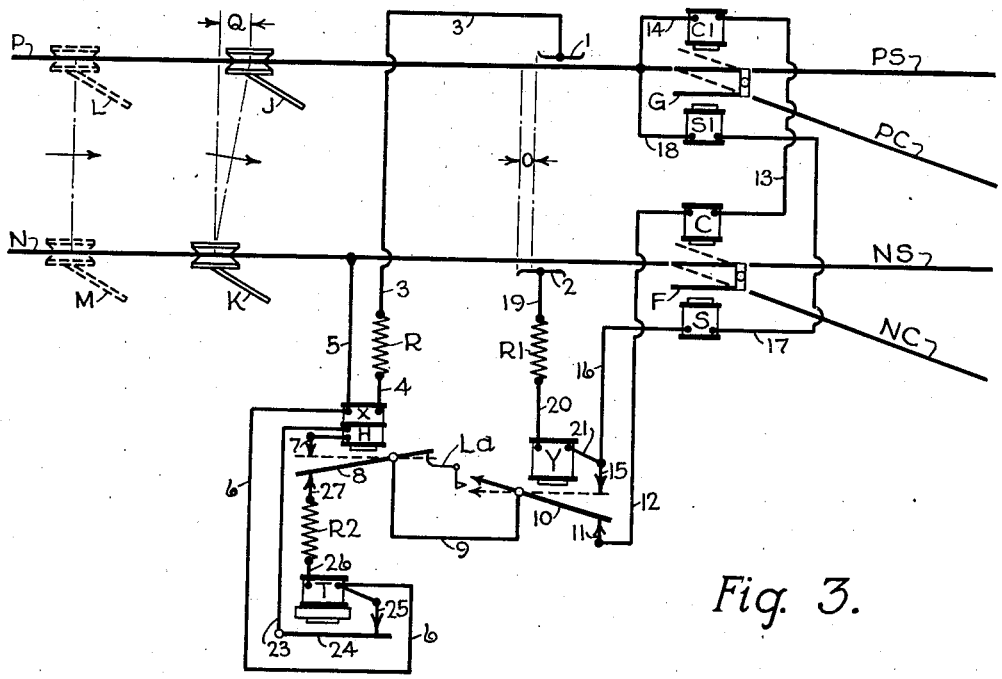
Fig. 3 illustrates a modification of Figure 2, introducing a time-element control to provide a definite time of operation for the trolley-frog operating coils.

The advantages of this arrangement will be more apparent when the following description in connection with Figure 3 is read.

In Figure 3, the electrical connections of the trolley-frog operating coils C—S and C1—S1 are substantially the same, as illustrated and described for Figure 2, except that an armature 24, of a time element relay T, and a low resistance holding coil H for relay X, has been included. It is to be further noted that, in Figure 3, wire 21 is connected to wire 16, thereby providing the completion of the circuit, for the coil of relay Y, through the trolley frog operating coils S and S1. In this respect attention is directed to the fact that ordinarily the trolley frog operating coils C—S and C1—S1 have a very low resistance in comparison with the resistance of the coil of relay Y and the resistor R1. Thus, the current flowing through the coil of relay Y and resistor R1, does not energize the trolley-frog coils S and S1 sufficient to operate their respective frog tongues F and G.

In Figure 3, the armature 24 of the time-element relay T, is substantially instantly raised, when the coil of relay T is energized, but is delayed in its release when the coil of relay T is de-energized. This action of relay T is symbolically represented by conventional symbols employed in Figure 3.

Referring more in detail to Figure 3, it will be observed that the coil of relay T is normally energized, thereby retaining armature 24 in engagement with front contact 25. The circuit of the operating coil of relay T being completed from the negative conductor N, through wire 5, wire 6, coil of relay T, wire 26, resistor R2, back contact 27, armature 8, wire 9, armature 10, back contact 11, wire 12, operating coil C, wire 13, operating coil C1, wire 14, to positive conductor P. The resistance of the trolley-frog operating coils C—S and C1—S1, are also very low in resistance in comparison with that of resistor R2 and the coil of relay T. Thus, the current flowing through the coil of relay T and resistor R1 is not sufficient to operatively energize the trolley-frog coils C and C1.

It is to be observed that the circuit for the coil of relay T is completed through back contact 27 and armature 8 of relay X. Therefore, whenever armature 8 is raised to direct current to the trolley-frog operating coils, the operating coil of relay T is de-energized.

For the purpose of illustration, it will be assumed that the collectors J and K approach the "turn-out." When the collector J engages contact device 1, the pick-up coil of relay X is energized, as described in connection with Figure 2, thereby raising armature 8 and actuating latch La to lock armature 10 in engagement with back contact 11. Raising armature 8 de-energizes the coil of relay T, as aforesaid. However, armature 24, is delayed in its release and retains engagement with front contact 25 for a predetermined time thereafter. Raising armature 8 also brings the armature into engagement with front contact 7, and completes the circuit of operating coils C and C1 as follows: from negative conductor N, through wire 5, wire 6, front contact 25, armature 24, wire 23, low resistance holding coil H, contact 7, armature 8, wire 9, armature 10, back contact 11, wire 12, operating coil C, wire 13, operating coil C1, wire 14 to positive conductor P.

The current flowing through the low resistance holding coil H is sufficient to retain armature 8 raised, and to energize the trolley-frog coils sufficient to operate their corresponding frog tongues F and G. Thus, even though the collector J may immediately thereafter disengage contact device 1, as would be the case under relatively high speeds, the armature 8 is retained raised as long as operating current flows to the trolley-frog operating coils.

Assuming collector J has disengaged contact device 1, then a predetermined time after the raising of armature 8, armature 24 releases and removes operating current from trolley-frog coils C and C1. Removing operating current from the trolley-frog coils de-energizes holding coil H, thereby releasing armature 8. Armature 8 releasing, reconnects back contact 27 and energizes the operating coil of relay T, which, in turn, raises armature 24 to its normally attracted position.

It is believed that further operation of Figure 3 will be obvious, when the selective operation of relays X and Y is considered in terms of the description of Figures 1 and 2. Therefore, further description of Figure 3 is omitted.

Thus, in Figure 3, I have provided automatic means for determining the length of time the trolley-frog operating coils shall be energized, and means that will provide a definite time of current application to the trolley-frog coils, for the operation of frog tongues F and G, independently of the time the contact device 1 is electrically connected to the positive conductor P.

Concerning the operation of relay T, emphasis is now made of the fact that the time of release of armature 24 is made sufficiently long to retain operating current flowing to the trolley frog coils, under ordinary operation, until the current collectors have passed entirely over the frog tongues F and G. Thus, the prolonged energization of the trolley-frog operating coils serves to retain the operation of the frog tongues, and thereby prevent accidental changes in the operation thereof because of excessive overhead vibration, etc.

Figure 4:
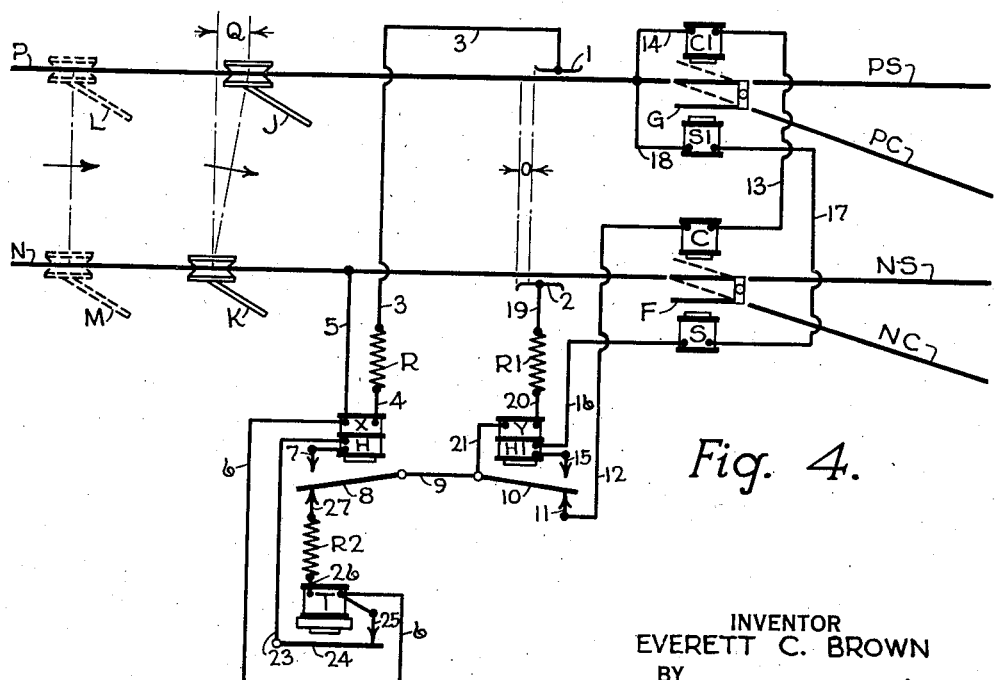
Fig. 4 illustrates one modification of Figure 3, to obviate the use of the mechanical latch La employed in Figures 1, 2 and 3.

In Figure 4 the apparatus of Figure 3 is illustrated in modified form in such a manner as to obviate the use of the mechanical latch La, but yet to retain its functions. Thus, the modification, shown in Figure 4, illustrates an entirely electrical method of retaining armature 10 in either of its positions.

To provide for this change of construction, the mechanical latch La and its associated parts have been omitted. In Figure 4, wire 21 is connected to wire 9 instead of wire 16, as shown in Figure 3. Thus, under this system of connections, wire 9 is substantially at negative potential whenever operating current is flowing from contact 7 to the trolley-frog operating coils, and since contact device 2 is connected to negative potential through collectors K or M, coil Y is substantially de-energized at such times. Therefore, if armature 8 is raised while armature 10 is engaging back contact 11, the placing of wire 9 at negative potential prevents an energization of the pickup coil of relay Y, when contact device 2 is subsequently engaged by collector K.

To provide for the retaining of armature 10 in engagement with its front contact 15, a low resistance holding coil H1 is provided and placed in series with the "through" route trolley-frog operating coils S and S1.

Therefore, if armature 8 is raised while armature 10 is engaging front contact 15, the placing of wire 9 at negative potential de-energizes the pickup coil of relay Y. However, as long as operating current flows through armature 10 and front contact 15 to the operating coils S and S1, the holding coil H1 is retained energized sufficient to hold armature 10 in the raised position.

Since the operation of Figure 4 is otherwise identical to Figure 3, further description is considered unnecessary in view of the specific treatment of the constructions leading up to the development of Fig. 4.

Thus, in Figure 4 I have illustrated an entirely electrical method of retaining the selective operation of armature 10. Therefore, although I have illustrated a mechanical means in connection with Figures 1, 2 and 3, I do desire to be limited to either specific embodiment, other than by the scope of the appended claims.

Having thus described my invention, I claim:

1. In a switching system for a pair of current collectors mounted on a vehicle, a pair of main trolley wires of opposite polarity and a branch wire for each main wire, a trolley frog at the intersection of each main and branch wire having a movable tongue for guiding a current collector on the vehicle either along the main wire or on to the branch wire depending on the position of the said movable tongue, means including a pair of operating coils associated with each frog for actuating its tongue in opposite directions, a single contact device located adjacent each main wire on the approach side of each frog so as to be electrically connected to its respective associated trolley wire during the passage of one of said current collectors therealong, and a relay selectively controlled by the engagement of the current collectors on the vehicle with the said contact devices dependent upon whether the current collectors both engage the contact devices at the same time or one in advance of the other and cooperative with one of said contact devices for selectively energizing the operating coils of the frogs, said order of engagement of the current collectors with the contact devices being dependent upon the angular position of the vehicle with respect to the main trolley wires.

2. In a switching system for a pair of current collectors mounted on a vehicle, a pair of main trolley wires of opposite polarity and a branch wire for each main wire, a trolley frog at the intersection of each main and branch wire having a movable tongue for guiding a current collector on the vehicle either along the main wire or on to the branch wire depending on the position of the said movable tongue, electro-magnetic means for actuating the frogs in opposite directions; a single contact device located adjacent each main wire on the approach side of the frog so as to be electrically connected with its associated wire during the passage of one of said current collectors therealong, a single relay for selectively controlling in conjunction with one of said contact devices the energization of the electro-magnetic actuating means for the frogs, said relay being selectively controlled by the engagement of the said current collectors with said contact devices, whereby the movable tongues are actuated in one predetermined direction when one of said contact devices is engaged by its associated current collector before the other contact device is engaged by the other current collector and in the other predetermined direction when the contact devices are engaged by the said current collectors substantially simultaneously.

3. In a switching system for a pair of current collectors mounted on a vehicle, a pair of main trolley wires of opposite polarity and a branch wire for each main wire, a trolley frog at the intersection of each main and branch wire having a movable tongue for guiding a current collector on the vehicle either along the main wire or on to the branch wire depending on the position of the said movable tongue, means including a pair of operating coils associated with each frog for actuating its tongue in opposite directions, a single contact device located adjacent each main wire on the approach side of the frog so as to be electrically connected to its respective associated trolley wire during the passage of one of said current collectors therealong, an energizing circuit for said operating coils connected to one of the main trolley wires and the contact device associated with the other main trolley wire, a relay for selectively controlling said energizing circuit, whereby the movable tongues of the frogs are actuated to their different positions when the said one contact device is engaged by its associated current collector dependent upon the position of the relay, said relay being selectively controlled by energization from both of said contact devices, whereby said relay functions to control the energizing circuit for the operating coils of the frogs to operate the movable tongue members thereof to one position when the said one contact device is engaged by its associated current collector before the other contact device is engaged by its associated current collector and to the other position when said contact devices are engaged by their associated current collectors substantially simultaneously.

4. In a switching system for a pair of current collectors mounted upon a vehicle; a source of power; a pair of main trolley-conductors and a branch conductor for each main conductor; a trolley frog at the junction of each main and branch conductor, each frog having a movable element operable either to one or to the other of two positions for guiding a collector either along the corresponding main conductor or from the said main conductor onto the corresponding branch conductor; an actuating mechanism for one of the said movable elements including two electromagnets operably associated therewith for moving the said element either to one or to the other of its operable positions as determined selectively by the selective energization of the said electromagnets; a contact device located adjacent each main conductor in a predetermined position relative one to the other longitudinally of the main conductors and in advance of the entering end of the said frogs, each of said devices having a normally-open switch adapted to be closed by the corresponding collector in passing the said device; a pair of relays, each relay having an operating coil and switches operated thereby; an operating circuit for the operating coil of one of the said relays including the source of power and the normally-open switch of the contact device located adjacent one of the said conductors; an operating circuit for the relay coil of the other of said relays including the source of power and the normally-open switch of the contact device located adjacent the other of said conductors; an operating circuit for one of said electromagnets including the source of power, a normally-open switch of the said one relay and a normally-closed switch of the said other relay; an operating circuit for the other of said electromagnets, including the source of power, a normally-open switch of the said one relay and a normally-open switch of the said other relay; means, operably associated with the said other relay, and operating in response to an operation of the said one relay, for retaining the switches of the said other relay in one or the other of their operable positions; the position of the current collectors relative one to the other longitudinally of the main conductors varying with the angularity of the vehicle relative to the main conductors, and the said positioning of the collectors and the aforesaid predetermined position of the contact devices being such as to determine selectively the energization of the operating coils of the said relays in accordance with the selective closing of the said switches of the contact devices as determined by the angularity of the vehicle relative to the main conductors as the collectors pass the said devices, thereby to determine selectively the energization of the operating circuits of the said electromagnets; and means, operably associated with the actuating mechanism for the said one movable element and the said other movable element, for correspondingly moving the said other movable element to its corresponding operable positions.

5. In a switching system for a pair of current collectors mounted upon a vehicle; a pair of main trolley-conductors of opposite polarity and a branch conductor for each main conductor; a trolley frog at the junction of each main and branch conductor, each frog having a movable element operable either to one or to the other of two positions for guiding a collector either along the corresponding main conductor or from the said main conductor onto the corresponding branch conductor; an actuating mechanism for one of the said movable elements including two electromagnets operably associated therewith for moving the said one element either to one or to the other of its operable positions as determined by the selective energization of the said electromagnets; a contact device located adjacent each main conductor in a predetermined position relative one to the other longitudinally of the main conductors and in advance of the entering end of the said frogs, each of the said devices adapted to be electrically connected to the corresponding main conductor by a collector passing the said device; a pair of relays, each relay having an operating coil and switches operated thereby; a control circuit for energizing the operating coil of one of said relays including an electrical connection from one terminal of the operating coil of the said one relay to the contact device adjacent one of said conductors, and an electrical connection from the other terminal of the operating coil of the said one relay to the other of said conductors; a control circuit for energizing the operating coil of the other of said relays including an electrical connection from one terminal of the operating coil of the said other relay to the contact device adjacent the said other conductor, and an electrical connection from the other terminal of the operating coil of the said other relay to the said one conductor; an operating circuit for one of said electromagnets including electrical connections to the said conductors, a normally-open switch of the said one relay, and a normally-closed switch of the said other relay; an operating circuit for the other of said electromagnets including electrical connections to the said conductors, a normally-open switch of the said one relay, and a normally-open switch of the said other relay; a mechanical latch, operably associated with the switches of the said other relay and operating in response to an energization of the operating coil of the said one relay, for retaining the switches of the said other relay in one or the other of their operable positions; the position of the current collectors relative one to the other longitudinally of the main conductors varying with the angularity of the vehicle relative to the main conductors, and the said positioning of the collectors and the aforesaid predetermined position of the contact devices being such as to determine sequentially the energization of the operating coil of the said relays in accordance with the sequential connecting of the contact devices to their respective conductors as the collectors pass the said devices, thereby to determine selectively the energization of the said electromagnets; and means, operably associated with the actuating mechanism for the said one movable element and the said other movable element, for correspondingly moving the said other movable element to its corresponding operable positions.

6. In a switching system for a pair of current collectors mounted upon a vehicle, a pair of main trolley-conductors of opposite polarity, and a branch conductor for each main conductor; a trolley frog at the junction of each main and branch conductor, each frog having a movable element operable either to one or to the other of two operable positions for guiding a collector either along the corresponding main conductor, or from the main conductor onto the corresponding branch conductor; an actuating mechanism for one of the said movable elements including two electromagnets operably associated therewith for moving the said one element either to one or to the other of its operable positions; means, operably associated with the actuating mechanism and the other of said movable elements, for correspondingly moving the said other movable element to its corresponding operable positions; a contact device located adjacent each main conductor in a predetermined position relative one to the other longitudinally of the main conductors and in advance of the entering end of the frogs, each of the said devices adapted to be electrically connected to the corresponding main conductor by a collector passing the said device; the position of the collectors relative one to the other longitudinally of the main conductors varying with the angularity of the vehicle relative to the main conductors, and the positioning of the collectors and the aforesaid pre- determined position of the contact devices being such as to connect selectively the said contact devices to their respective conductors as determined by the angularity of the vehicle relative to the main conductors as the collectors pass the said devices; a relay having an operating coil and a normally-closed switch opened by the energization of the said coil, and a normally-open switch closed by the energization of the said coil; a circuit for energizing the said operating coil including the main conductors and the contact device adjacent one of the said main conductors; an operating circuit for one of the aforesaid electromagnets including the main conductors, the normally-closed switch of the said relay and the contact device adjacent the other of said conductors; an operating circuit for the other of the aforesaid electromagnets including the main conductors, the normally-open switch of the said relay and the contact device adjacent the said other of said conductors; control means, operably associated with the said relay and the contact device adjacent the said other of said conductors, for retaining the switches of the said relay in their said normal positions when the contact device adjacent the said other of said conductors is connected to its respective conductor before the contact device adjacent the said one of said conductors is connected to its respective conductor; and control means, operably associated with the said relay and the contact device adjacent the said other of said conductors, for retaining the switches in the positions effected by the energization of the operating coil of the said relay when the contact device adjacent the said one of said conductors is connected to its respective conductor before the contact device adjacent the said other of said conductors is connected to its respective conductor, thereby to operate selectively the said actuating mechanism and associate means for moving selectively each of the said movable elements to one or the other of their operable positions.

7. In a switching system for a pair of current collectors mounted upon a vehicle; a pair of main trolley-conductors of opposite polarity, and a branch conductor for each main conductor; a trolley frog at the junction of each main and branch conductor, each frog having a movable element operable either to one or to the other of two operable positions for guiding a collector either along the corresponding main conductor, or from the main conductor onto the corresponding branch conductor; an actuating mechanism for one of the said movable elements including two electromagnets operably associated therewith for moving the said one element either to one or to the other of its operable positions; means operably associated with the said actuating mechanism and the other of said movable elements, for correspondingly moving the said other movable element to its corresponding operable positions; a contact device located adjacent each main conductor in a predetermined position relative one to the other longitudinally of the main conductors and in advance of the entering end of the said frogs, each of the said devices adapted to be actuated by a collector passing the same; the position of the collectors relative one to the other longitudinally of the main conductors varying with the angularity of the vehicle relative to the main conductors, and the positioning of the collectors and the aforesaid predetermined position of the contact devices being such as to provide selective actuation of the said contact devices as determined by the angularity of the vehicle relative to the main conductors as the collectors pass the contact devices; a first relay having selector switches operably associated with the said electromagnets for selectively directing operating current to one or the other of said electromagnets, and having an operating coil operably associated with one of the said contact devices for operating the said selector switches in response to an actuation of the said one contact device; a second relay having a control switch operably associated with the said selector switches for establishing a flow of operating current to one or the other of said electromagnets in accordance with the selective operation of the said selector switches, and having an operating coil operably associated with the other of said contact devices for operating the said control switch in response to an actuation of the said other contact device; and means operably associated with the said first relay, and operating in response to an operation of the said second relay, for retaining the selection of the selector switches as long as operating current flows to the said electromagnets.

8. A switching system for current collectors of a dirigible vehicle, including, in combination, a pair of main trolley-conductors of opposite polarity, and a branch conductor for each main conductor; a pair of current collectors mounted upon a dirigible vehicle and collecting propulsion current from the said conductors, the positions of the collectors relative one to the other longitudinally of the main conductors varying with the angularity of the vehicle relative to the main conductors; a trolley frog at the junction of each main and branch conductor, each frog having a movable element operable either to one or to the other of two operable positions for guiding a collector either along the corresponding main conductor, or from the main conductor onto the corresponding branch conductor; an actuating mechanism for one of the said movable elements including two electromagnets operably associated therewith for moving the said one element either to one or to the other of its operable positions; means operably associated with the said actuating mechanism and the other of said movable elements, for correspondingly moving the said other movable element to its correspondingly operable positions; a contact device located adjacent each main conductor in a predetermined position relative one to the other longitudinally of the main conductors and in advance of the entering end of the said frogs, such that the contact devices are actuated selectively by the collectors, as determined by the angularity of the vehicle relative to the main conductors as the collectors pass the said contact devices; a first relay having selector switches operably associated with the said electromagnets for selectively directing operating current to one or the other of said electromagnets, and having an operating coil operably associated with one of said contact devices for operating the said selector switches in response to an actuation of the said one device; a second relay having a control switch operably associated with the said selector switches for establishing a flow of operating current to one or the other of said electromagnets in accordance with the operation of the selector switches, and having an operating coil operably associated with the other of said contact devices for operating the said control switch in response to an actuation of the said other of said contact devices; a third relay having a delayed-opening switch operably associated with the said electromagnets for discontinuing the flow of operating current thereto, and having an operating coil operably associated with the said second relay for opening the said delayed-opening switch a predetermined time after the operation of the said second relay; means operably associated with the said first relay, and operating in response to an operation of the said second relay, for retaining the selection of the said selector switches as long as operating current flows to the said electromagnets; and means operably associated with the said second relay, and operating in response to an operation of the said control switch, for retaining the said control switch operated as long as operating current flows to the said electromagnets.

9. In a switching system for a pair of current collectors mounted upon a dirigible vehicle; a source of power; a pair of main trolley-conductors for the said collectors, and a branch conductor for each main conductor; the position of the collectors relative one to the other longitudinally of the main conductors varying with the angularity of the vehicle relative to the main conductors; a trolley frog at the junction of each main and branch conductor, each frog having a movable element operable either to one or to the other of two positions for guiding a collector either along the corresponding main conductor or from the said main conductor onto the corresponding branch conductor; an actuating mechanism for one of the said movable elements including two electromagnets operably associated therewith for moving the said element either to one or to the other of its operable positions; means operably associated with the said mechanism, and with the other of said movable elements, for correspondingly moving the said other movable element to its corresponding operable positions; a contact device located adjacent each main conductor in a predetermined position relative one to the other longitudinally of the main conductors and in advance of the said frogs; the said contact devices adapted to be actuated selectively by the collectors as determined by the angularity of the vehicle relative to the main conductors as the collectors pass the said devices; a normally-open switch operably associated with each contact device, each switch adapted to be closed by the actuation of its corresponding device; a pair of relays, each relay having an operating coil and switches operated thereby; an operating circuit for the operating coil of one of the said relays including the source of power and the normally-open switch of the contact device located adjacent one of the said conductors; an operating circuit for the relay coil of the other of said relays including the source of power and the normally-open switch of the contact device located adjacent the other of said conductors; a circuit for energizing one of the said electromagnets including the source of power, a normally-open switch of the said one relay and a normally-closed switch of the said other relay; a circuit for energizing the other of said electromagnets including the source of power, a normally-open switch of the said one relay and a normally-open switch of the said other relay; means operably associated with the said other relay, and operating in response to an operation of the said one relay, for retaining the switches of the said other relay in their normal positions, when the device adjacent the said one conductor is actuated before the device adjacent the said other conductor; and means operably associated with the said other relay, and operating in response to an operation of each of the said relays, for retaining the switches of the said other relay in the positions effected by the energization of the operating coil thereof, when the device adjacent the said other conductor is actuated before the contact device adjacent the said one conductor.

10. In a switching system for a pair of current collectors mounted upon a dirigible vehicle; a source of power; a pair of main trolley-conductors for the said collectors, and a branch conductor for each main conductor; the position of the collectors relative one to the other longitudinally of the main conductors varying with the angularity of the vehicle relative to the main conductors; a trolley frog at the junction of each main and branch conductor, each frog having a movable element operable either to one or to the other of two positions for guiding a collector either along the corresponding main conductor or from the said main conductor onto the corresponding branch conductor; an actuating mechanism for one of the said movable elements including two electromagnets operably associated therewith for moving the said one element either to one or to the other of its operable positions; means operably associated with the said mechanism, and with the other of said movable elements, for correspondingly moving the said other movable element to its corresponding operable positions; a contact device located adjacent each main conductor in a predetermined position relative one to the other longitudinally of the main conductors and in advance of the frogs, the said contact devices adapted to be actuated selectively by the collectors as determined by the angularity of the vehicle relative to the main conductors as the collectors pass the said devices; a relay having selector switches operably associated with the said electromagnets for selectively directing operating current to one or the other of said electromagnets, and having an operating coil operably associated with one of the said contact devices for operating the selector switches in response to an actuation of the said one contact device; means operably associated with the said selector switches, and operating in response to an actuation of the other of said contact devices, for establishing a flow of operating current to the said electromagnets in accordance with the selective operation of the said selector switches; and means operably associated with the said relay, and operating in response to the actuation of the said other contact device, for retaining the selection of the selector switches as long as operating current flows to the said electromagnets.

11. In a switching system for a pair of current collectors mounted upon a dirigible vehicle; a source of power; a pair of main trolley-conductors for the said collectors, and a branch conductor for each main conductor; the position of the said collectors relative one to the other longitudinally of the main conductors varying with the angularity of the vehicle relative to the main conductors; a trolley frog at the junction of each main and branch conductor, each frog having a movable element for guiding a collector either along the corresponding main conductor or from the said main conductor onto the corresponding branch conductor; an actuating mechanism for one of the said movable elements including two electromagnets operably associated therewith for moving the said one element either to one or to the other of its operable positions; means operably associated with the said mechanism, and with the other of said movable elements, for correspondingly moving the said other element to its corresponding operable positions; a contact device located adjacent each main conductor in a predetermined position relative one to the other longitudinally of the main conductors and in advance of the said frogs, the said positioning of the devices being such that one of said devices is actuated by the corresponding collector before the other of said devices is actuated by its corresponding collector, when the vehicle moves substantially in the direction of the main conductors as the collectors pass the said devices, and such that the said other device is actuated before the one device, when the vehicle moves at an angle to the main conductors and substantially in the direction of the branch conductors as the collectors pass the said devices; a selector relay having an operating coil electrically connected to the said one contact device and adapted to operate in response to an actuation of the said one contact device; a control relay having an operating coil electrically connected to the said other contact device and adapted to operate in response to an actuation of the said other contact device; an operating circuit for the electromagnet adapted to move the said elements to guide the collectors along the main conductors including the source of power, a normally-open contact of the control relay and a normally-open contact of the selector relay; and an operating circuit for the electromagnet adapted to move the said elements to guide the collectors from the main conductors onto the branch conductors including the source of power, a normally-open contact of the control relay and a normally closed contact of the selector relay.

EVERETT C. BROWN.